(12) United States Patent
Meixner et al.

(10) Patent No.: US 7,823,653 B2
(45) Date of Patent: Nov. 2, 2010

(54) HAND-HELD POWER TOOL WITH A BELT TENSIONING DEVICE

(75) Inventors: Ralf Meixner, Germaringen (DE); Guenther Veik, Maeder (AT); Hans-Joerg Rieger, Thueringen (AT)

(73) Assignee: Hilti Aktiengesellschaft, Schaan (LI)

( * ) Notice: Subject to any disclaimer, the term of this patent is extended or adjusted under 35 U.S.C. 154(b) by 83 days.

(21) Appl. No.: 12/283,981

(22) Filed: Sep. 16, 2008

(65) Prior Publication Data

US 2009/0082145 A1   Mar. 26, 2009

(30) Foreign Application Priority Data

Sep. 20, 2007   (DE)   .................. 10 2007 000 750

(51) Int. Cl.
*F16H 7/08*   (2006.01)
(52) U.S. Cl. .............................. 173/24; 173/38; 173/39; 173/45; 173/145
(58) Field of Classification Search ............ 173/24, 173/38, 39, 45, 52, 145, 146; 474/109
See application file for complete search history.

(56) References Cited

U.S. PATENT DOCUMENTS

| | | | | |
|---|---|---|---|---|
| 3,606,707 A * | 9/1971 | Naslund | ................ | 51/439 |
| 4,067,397 A * | 1/1978 | Dobroborsky | ............... | 173/32 |
| 4,199,285 A * | 4/1980 | Bader et al. | ................. | 409/206 |
| 4,683,962 A * | 8/1987 | True | ........................... | 173/215 |
| 4,792,322 A * | 12/1988 | Goppelt et al. | .............. | 474/136 |
| 4,822,322 A * | 4/1989 | Martin | ....................... | 474/135 |
| 5,289,887 A * | 3/1994 | Puttmann | ..................... | 175/61 |
| 5,601,505 A * | 2/1997 | Tada | ......................... | 474/110 |
| 5,632,698 A * | 5/1997 | Suzuki | ...................... | 474/110 |
| 5,700,215 A * | 12/1997 | Tada et al. | .................. | 474/110 |
| 6,004,112 A * | 12/1999 | Cook et al. | ................. | 417/362 |
| 6,165,091 A * | 12/2000 | Dinca et al. | ................. | 474/112 |
| 6,264,578 B1 * | 7/2001 | Ayukawa | .................... | 474/136 |
| 6,663,475 B2 * | 12/2003 | Price | ......................... | 451/297 |
| 6,849,012 B2 * | 2/2005 | Poiret et al. | ................ | 474/110 |
| 6,852,049 B2 * | 2/2005 | Markley et al. | ............. | 474/109 |
| 7,077,772 B2 * | 7/2006 | Hashimoto et al. | .......... | 474/109 |
| 7,331,891 B2 * | 2/2008 | Poiret | ........................ | 474/110 |
| 7,410,085 B2 * | 8/2008 | Wolf et al. | .................. | 227/131 |
| 7,458,909 B2 * | 12/2008 | Hashimoto et al. | .......... | 474/110 |
| 7,500,589 B2 * | 3/2009 | Wolf et al. | .................. | 227/131 |
| 2006/0052194 A1 * | 3/2006 | Gerring | ...................... | 474/109 |
| 2006/0258497 A1 * | 11/2006 | Dec | ............................ | 474/112 |

* cited by examiner

*Primary Examiner*—Brian D Nash
(74) *Attorney, Agent, or Firm*—Abelman, Frayne & Schwab

(57) ABSTRACT

A hand-held power tool for driving a working tool (1) includes a drive belt (3), first and second arms (5a, 5b) longitudinally displaceable relative to each other and carrying respective deflection rollers (6) of the drive belt (3), a belt tensioning device (4) located between the first and second arms (5a, 5b) and including a spring (8) preloaded against the first arm (5a), and a displaceable pressure piston (9) located between the spring (8) and the second arm (56).

3 Claims, 1 Drawing Sheet

US 7,823,653 B2

HAND-HELD POWER TOOL WITH A BELT TENSIONING DEVICE

BACKGROUND OF THE INVENTION

1. Field of the Invention

The present invention relates to a hand-held power tool for rotatably driving a working tool, in particular, a combustion-engined concrete cutting and grinding power tool including a drive belt and a belt tensioning device located between two arms longitudinally displaceable relative to each other and carrying respective deflection rollers of the drive belt.

2. Description of the Prior Art

Because the drive belt is subjected to fatigue and wear during its intended use, it becomes stretched, which requires a regular aftertensioning by lengthening the drive path, e.g., increasing the distance between the two deflection rollers. Necessarily, after a manual release of the locking means, the actual aftertensioning of the drive belt requires a complete control of the user. Generally, and optimal belt tensioning can be determined by using appropriate textbook or manual recommendations. However, practically, it cannot be reliably established.

Automatic belt tensioning devices with a preloaded spring are known and are disclosed, e.g., in German Publications DE 746 011 and DE 198 49 886. U.S. Pat. No. 3,606,707 discloses a combustion-engined concrete cutting and grinding power tool in which a semi-automatic (i.e., after a manual release of the locking means) belt tensioning device provides for an optimal belt tensioning with a preloaded compression spring arranged between two telescopic arms. Then, both arms are locked with respect to each other, using clamping screws.

German Publication DE 38 41 644 discloses a combustion-engined concrete cutting and grinding power tool with a semi-automatic belt tensioning device that provides an optimal belt tensioning, using a compression spring preloaded against the first arm and which tensions a pull rod displaceable coaxially in the interior of the belt tensioning device and eccentrically connected with a rotary setting device that rotates within the second arm. When the rotary setting device is manually rotated against the biasing force of the compression spring and moves toward the stop over the near dead point of the mutual longitudinal displacement of the arms, the compression spring becomes preloaded against the stop. Thereby, the arm becomes longitudinally and tension-free displaceable, which makes replacement of the drive belt possible.

An object of the present invention is to provide a hand-held power tool with a simplified semi-automatic belt tensioning device.

SUMMARY OF THE INVENTION

This and other objects of the present invention, which will become apparent hereinafter, are achieved by providing a hand-held power tool for driving a working (e.g., disc-shaped) tool and including a drive belt, two arms longitudinally displaceable relative to each other and carrying respective deflection rollers of the drive belt, a belt tensioning device located between the two arms and including a spring preloaded against a first arm, and a displaceable pressure piston located between the spring and the second arm.

With a pressure piston, which is displaced by the preloaded spring and which applies pressure to the second arm, the distance between the deflection rollers (in the belt plane) is increased, so that the drive belt becomes semi-automatically (i.e., after a manual release of the locking means) optimally tensioned.

Advantageously, there is provided a rotatable rotary setting device arranged in the first arm and excentrically engaging the pressure piston, and advantageously, extending in a receiving slot that extends transverse to the tensioning direction of the pressure piston. As a result, the pressure piston, upon being displaceable by the spring, would rotate the rotary setting device. Thereby an actual semi-automatic displacement of the arm or the fatigue condition of the drive belt can be made optically visible to the user (by marking the rotary device and the first arm).

Advantageously, there is provided, on the first arm, a rotary stop for the rotary setting device and against which the preloaded spring automatically presses upon a manual rotation of the rotary setting device against a biasing force of the spring and past the near dead point of the mutual longitudinal displacement of the arms. Thereby, the arms themselves can be longitudinally displaced tension-free, which makes the replacement of the belt possible.

Advantageously, there is further provided manually releasable locking means for fixedly securing the two arms with each other. Thereby, the distance between the arms and, thus, the belt tension remains constant with an appropriate use of the power tool.

Advantageously, the power tool is formed as a combustion-engined concrete cutting and grinding power tool.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
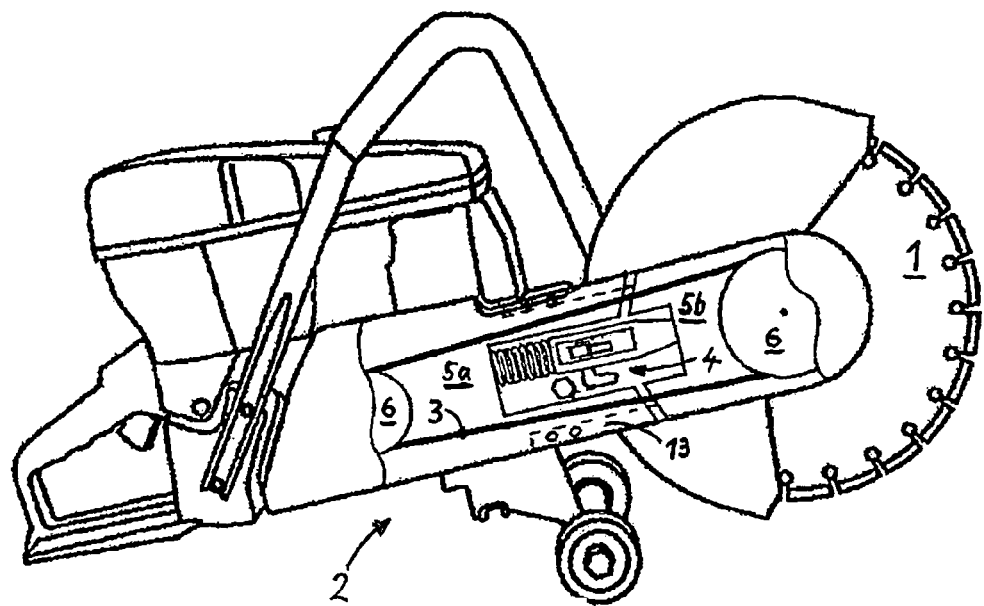
FIG. 1 a schematic view of a hand-held power tool in a tensioning condition.

A hand-held power tool 2 for rotating a disc-shaped working tool 1, which is shown in FIG. 1 and is formed as a combustion-engined concrete cutting and grinding power tool, includes a drive belt 3 and a belt tensioning device 4. The belt tensioning device 4 is arranged between two arms 5a and 5b longitudinally displaceable relative to each other and with deflection rollers 6 of the drive belt 3. With released locking means 13 in form of locking screws between the arms 5a, 5b, in the tensioning condition shown in FIG. 1, the belt tensioning device 4 preloads the arm 5a, 5b and, thus, semi-automatically tensions the drive belt 3.

Figure 2:
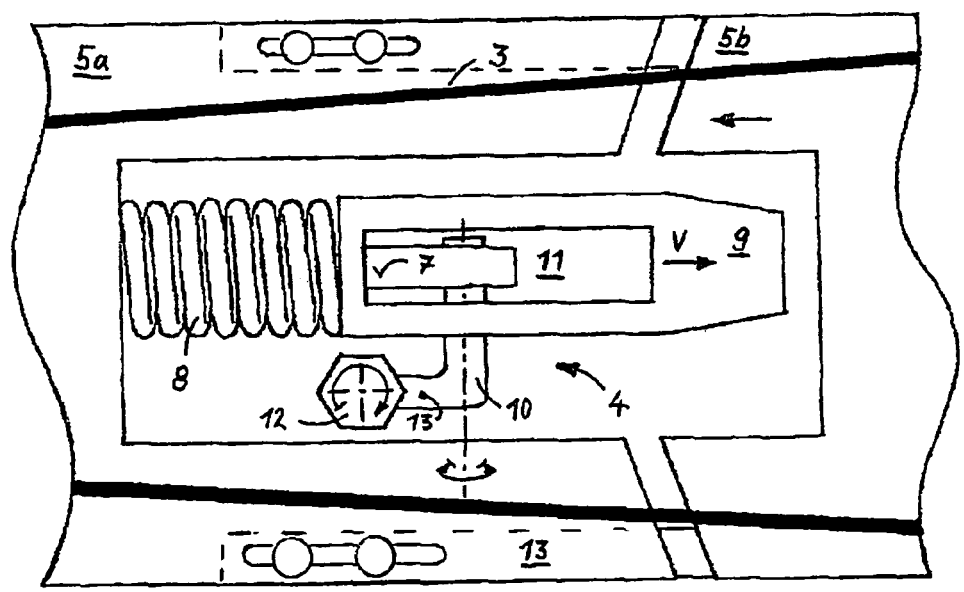
FIG. 2 a view of a detail of the hand-held power tool shown in FIG. 1 in a release condition.

FIG. 2 shows a detail of the power tool shown in FIG. 1 in a released condition, with the released locking means 13, in which a spring 8 in form of a helical compression spring, which forms part of the belt tensioning device 4, is preloaded against the first arm 5a. Between the spring 8 and the second arm 5b, there is arranged a displaceable elongate pressure piston 9. In the first arm 5a, there is further provided a rotatable rotary adjusting device 10 which is connected with an excentric cam 7 located in a receiving slot 11 extending in the elongate pressure piston 9 in the tensioning direction V. The cam 7 engages the pressure piston 9, forming a one-side butt contact therewith. On the first arm 5a, there is provided a rotary stop 12 in form of a stop screw for the rotary adjusting device 10, and against which the spring 8, which is still preloaded at this point, automatically presses, upon a manual rotation of a lever 13 of the rotary adjusting device 10 against the biasing force of the spring 8 and a longitudinal displacement of the arms 5a, 5b toward each other and past the dead point of the excentric cam 7. With the pressure piston 9 not pressing any more against the arm 5b, the arm 5b can be displaced relative to the arm 5a in an unloaded condition, whereby the drive belt 3 is slackened and can be replaced.

Though the present invention was shown and described with references to the preferred embodiment, such is merely illustrative of the present invention and is not to be construed as a limitation thereof and various modifications of the present invention will be apparent to those skilled in the art. It is therefore not details thereof, and the present invention includes all variations and/or alternative embodiments within the spirit and scope of the present invention as defined by the appended claims.

What is claimed is:

1. A hand-held power tool for driving a working tool (1), comprising a drive belt (3); two arms (5a, 5b) longitudinally displaceable relative to each other and carrying respective deflection rollers (6) on the drive belt (3); a belt tensioning device (4) located between the two arms (5a, 5b) and including a spring (8) preloaded against a first arm (5a); a displaceable pressure piston (9) located between the spring (8) and the second arm (5b); and a rotatable rotary setting device (10) arranged in the first arm (5a) and excentrically engaging the pressure piston (9).

2. A hand-held power tool according to claim 1, further comprising a rotary stop (12) for the rotary setting device (10) and provided in the first arm (5a), and against which the preloaded spring (8) automatically presses upon a manual rotation of the rotary setting device (10) against a biasing force of the spring (8) and past the near dead point of the mutual longitudinal displacement of the arms (6a, 5b).

3. A hand-held power tool for driving a working tool (1), comprising a drive belt (3); two arms (5a, 5b) longitudinally displaceable relative to each other and carrying respective deflection rollers (6) on the drive belt (3); a belt tensioning device (4) located between the two arms (5a, 5b) and including a spring (8) preloaded against a first arm (5a); a displaceable pressure piston (9) located between the spring (8) and the second arm (5b); and manually releasable locking means (14) for fixedly securing the two arms (5a, 5b) relative to each other.

* * * * *